United States Patent [19]

Fletcher et al.

[11] 4,039,347
[45] Aug. 2, 1977

[54] METHOD OF PREPARING ZINC ORTHOTITANATE PIGMENT

[76] Inventors: James C. Fletcher, Administrator of the National Aeronautics and Space Administration, with respect to an invention of; Daniel W. Gates, Huntsville, Ala.; Yoshiro Harada, Skokie, Ill.; William R. Logan, Wheaton, Ill.; John E. Gilligan, Prospect Heights, Ill.

[21] Appl. No.: 696,989

[22] Filed: June 17, 1976

[51] Int. Cl.$^2$ .......................... C09C 1/36; C09C 1/04
[52] U.S. Cl. .................... 106/292; 106/296; 106/299
[58] Field of Search ................ 106/292, 296, 299

[56] References Cited

U.S. PATENT DOCUMENTS

| | | | |
|---|---|---|---|
| 2,140,235 | 12/1938 | Lederle et al. | 106/296 |
| 3,337,358 | 8/1967 | Vossen | 106/292 |
| 3,607,338 | 9/1971 | Webb | 106/292 |

FOREIGN PATENT DOCUMENTS 493,871   10/1938   United Kingdom ............... 106/292

*Primary Examiner*—Patrick P. Garvin
*Assistant Examiner*—J. V. Howard
*Attorney, Agent, or Firm*—L. D. Wofford, Jr.; Joseph H. Beumer; John R. Manning

[57] ABSTRACT

Zinc orthotitanate ($Zn_2TiO_4$) suitable for use as a pigment for spacecraft thermal control coatings is prepared by heating a slightly zinc-deficient reaction mixture of precipitated oxalates of zinc and titanium. The reaction mixture can be formed by co-precipitation of zinc and titanium oxalates from chloride solution or by mixing separately precipitated oxalates. The mixture is first heated to 400° to 600° C to remove volatiles and is then rapidly heated at 900° to 1200° C. Zinc orthotitanate produced by this method exhibits the very fine particle size needed for thermal control coatings as well as stability in a space environment.

5 Claims, No Drawings

METHOD OF PREPARING ZINC ORTHOTITANATE PIGMENT

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC2487).

BACKGROUND OF THE INVENTION

This invention relates to zinc titanate pigments and to spacecraft thermal control coatings utilizing such pigments.

Long term operation of vehicles and equipment in the space environment requires the availability of effective thermal control coatings. In the absence of a stable white coating or other protective measures, surfaces which are exposed to solar radiation would rapidly become overheated, largely because of absorption of solar energy. Spacecraft equipment would eventually manfunction when its temperature limitations were exceeded. Coatings for such applications should exhibit a very low and stable ratio of solar absorptance ($\alpha s$) to infrared emittance ($\epsilon$) along with good mechanical integrity and ease of application.

Various problems have been presented in the development of pigments and coatings for space applications. Many pigments which have favorable reflectance properties for terrestrial uses undergo a severe degradation of reflectance upon prolonged exposure to the combined conditions of vacuum and ultraviolet radiation encountered in outer space. Most of the binders and vehicles used for conventional coatings cannot be used in space because they are rapidly damaged by solar ultraviolet radiation. In some cases pigments and binders which are stable to the space environment may be incompatible with one another.

Progress has been made in recent years in determining degradation mechanisms and providing stable binders and pigments for space applications. For example, U.S. Pat. Nos. 3,576,656 and 3,607,338 disclose methods of treating zinc oxide and zinc orthotitanate pigments, respectively, to improve their initial reflectance and resistance to loss in reflectance upon exposure to ultraviolet radiation in vacuum. A need exists, however, for further improvement in pigment properties, particularly for zinc orthotitanate, which exhibits higher intrinsic reflectance than the zinc oxide and titanium oxide from which it has been conventially prepared by solid-state reactions. One source of pigment damage and loss of stability has been the grinding or milling steps required to obtain the very small particle size (submicron to 5 microns, and primarily about .6 micron) needed for optimum reflectance of solar radiation. Zinc orthotitanate prepared by previous zinc oxidetitanium oxide reactions has a much larger particle size, and the prolonged grinding or milling required to obtain finer particles results in decreased reflectance owing to particle damage (commonly known as "mill yellowing"). In addition, contaminating impurities are inherently introduced, and degradation resistance is decreased owing to the creation of active sites for degradation mechanisms. Initial formation of pigment particles in the desired size range would alleviate these problems. Another problem encountered with zinc orthotitanate pigments is that they frequently show decreased reflectance at wavelengths below 380 nm, indicating absorption by small amounts of uncombined zinc oxide.

SUMMARY OF THE INVENTION

In the present invention zinc orthotitanate is prepared by heating a slightly zinc-deficient mixture of precipitated zinc oxalate and titanium oxlate. The oxalate mixture, which can be prepared by combining separately precipitated zinc oxalate and titanium oxalate or by co-precipitation of mixed oxalates from chloride solution, is heated to 400° to 600° C to remove volatile decomposition products and is then heated at 900° to 1200° C. This method produces zinc orthotitanate primarily made up of particles in the very fine size range needed for thermal control coating pigments.

Grinding or milling requirements are minimized so that a purer product, with better reflectance and stability in the space environment, is obtained. Reflectance properties at critical wavelengths are also enhanced by use of a slightly zinc-deficient, rather than stoichiometric, reaction mixture.

It is therefore an object of this invention to provide an improved method of preparing zinc orthotitanate.

Another object is to provide if preparing zinc orthotitanate pigment wherein the pigment is initially formed in submicron size particles.

Another object is to provide a method of preparing zinc orthotitanate wherein requirements for milling or grinding are minimized.

Yet another object is to provide zinc orthotitanate pigment having improved stability and resistance to degradation in the space environment.

DESCRIPTION OF THE PREFERRED EMBODIMENT

The decomposable oxalate compounds from which the zinc orthotitanate is prepared can be readily obtained by precipitation from zinc and titanium chloride solution with an aqueous oxalic acid solution. Although not critical, it is preferred to use chloride solutions at a concentration of about 10 to 30 weight per cent and oxalic acid at a concentration of 10 to 20 weight per cent. The titanium chloride solution can be prepared by dropwise addition of TiCl$_4$ liquid to water in an ice bath to avoid hydrolysis of the TiCl$_4$. Zinc and titanium oxalate can be precipitated separately and mixed subsequently or mixed initially by co-precipitation. Although co-precipitation is advantageous in that an intimate reaction mixture is formed without requiring powder mixing or blending, separate precipitation with subsequent mixing is preferred because better control of reaction stoichiometry is realized and problems associated with formation of coarse zinc oxlate particles in co-precipitation are avoided.

Precipitation from either separate or mixed zinc and titanium chloride solutions can be readily carried out by mixing with oxalic acid solution and maintaining the reaction mixture under agitation and mild heating. For co-precipitation, a preferred procedure includes the steps of mixing the zinc-titanium chloride and oxalic acid solutions at a temperature of about 40° C and heating at about 90° C under agitation for about one to four hours, depending on batch size. In the case of separately precipitating zinc and titanium oxalate, a temperature of 10° C to 30° C is preferred for zinc and 80° C to 95° C for titanium oxalate, for a reaction time of at least about one hour in either case.

The precipitated zinc and titanium oxalates, or mixture thereof, can be recovered by filtration, washing and drying. Filtration is readily performed on a laboratory scale by use of a Buchner funnel system under slight vacuum. Conventional equipment and techniques can be used for larger amounts of material. The filtered precipitate is then washed thoroughly with hot water until there is no evidence of acid in the filtrate, thus showing removal of any hydrochloric acid and oxalic acid. The washed precipitate is thoroughly dried by light heating in air, with a temperature of 60° to 80° C for a period of at least 10 to 36 hours being suitable for this purpose.

For co-precipitated oxalates the resulting dried powder is ready for calcining. In the case of separately precipitated oxalates, the separate powders are combined and mixed thoroughly, for example, by dry blending for 2–6 hours. (This blending step, since it is performed prior to conversion to zinc orthotitanate, does not degrade pigment properties appreciably).

The zinc and titanium oxalates, or in the case of co-precipitated oxalates the zinc and titanium chlorides, are combined at a molar proportion slightly deficient in zinc, as compared to the stoichiometric 2:1 zinc-to-titanium molar ratio represented by the formula ($Zn_2TiO_4$) for zinc orthotitanate. Zinc-to-titanium molar ratios of 1.92:1 to 1.98:1 can be used, and about 1.95:1 is preferred. Larger amounts of zinc will result in decreased reflectance at wavelengths shorter than 380 nm, the characteristic absorption edge of zinc oxide. Although it would be expected that use of a zinc-deficient mixture would result in the presence of unconverted titanium oxide, thereby producing decreased reflectance, such is not the case. Free titanium oxide is not present when the above-stated molar ratios are used; apparently non-stoichiometric complex molecules are formed along with zinc orthotitanate, the reflectance of such molecules being equivalent to that shown by stoichiometric zinc orthotitanate. At ratios below the range given above, reflectance properties are initially favorable, but long-term stability under ultraviolet radiation in vacuum is decreased.

Conversion of the oxalate mixture to zinc orthotitanate is carried out in two steps: A pre-calcine step of heating to 400° to 600° C in order to remove volatiles released in decomposition of precursor compounds and a final, rapid calcine at 900° to 1200° C. The initial step is required to avoid violet reactions which would otherwise occur if the mixture was immediately subjected to higher temperature conditions. In the final calcine the powder is heated at 900° to 1200° C, and preferably at about 1000° C to 1050° C until conversion to zinc orthotitanate is completed. Higher temperatures are to be avoided since they result in loss of fine particle size by sintering. Rapid final firing also serves to maintain fine particle size. In a preferred procedure the powder mixture, in a container such as a fused quartz vessel, is inserted in a furnace that has been pre-heated to the desired temperature, thus avoiding a prolonged heat-up time. At the preferred temperature a firing period of 1 to 18 hours can be used, depending on batch size. The fired powder is then removed from the oven to avoid a long cool-down time.

The product obtained in the two-step firing procedure is zinc orthotitanate primarily made up of particles in the submicron range, with near-ideal size distribution for solar-reflector pigment use; in particular, most of the particles are submicron in size, with a sufficient amount of particles at or near .6 microns in size so that optimum reflectance is provided. Any agglomeration can be broken up by light ball-milling and larger particles can be removed by screening.

The resulting pigment is suitable for use in thermal control coatings for spacecraft as well as for other applications. For thermal-control coating applications the pigment is combined with a suitable degradation-resistant binder. Most organic resins are not stable in the space environment but certain silicones can be used. Examples of suitable binders include the polymethylsiloxane resin available commercially from the Owens-Illinois Glass Company under the designation "OI-650" and poly-dimethylsiloxane elastomer available commercially from the General Electric Company under the designation "RTV-602". Further details regarding formulation of thermal control coating are available in U.S. Pat. No. 3,576,656 and pigments prepared by the present invention can be used in place of zinc oxide in the coatings described therein.

The invention is further illustrated by the following examples:

EXAMPLE

Zinc orthotitanate samples (approximately 250 grams product per sample) were prepared from mixtures of titanium oxalate and zinc oxalate at varied zinc-to-titanium molar ratios by the following procedure: Titanium oxalate was precipitated by reaction of a titanium chloride solution with an oxalic acid solution under agitation for one hour at 90° C. Zinc oxalate was precipitated by reaction of a zinc chloride solution with an oxalic acid solution under agitation for one hour at 40° C. The oxalate precipitates were then filtered, washed and thoroughly dried. The dried oxalate powders were combined at zinc-to-titanium molar ratios of 1.90:1; 1.95:1; 2.00:1; and 2.05:1 by dry mixing for 16 hours. All sample mixtures were then fired at 600° C for 2 hours in air. One-half of each sample was then fired at 900° C in air for 2 hours and the other half was fired at 1200° C in air for two hours. In all cases "flash firing" was used, that is, the samples in a quartz container were inserted into an oven pre-heated to firing temperature and withdrawn directly to room temperature for cooling after firing.

Particle size of the fired samples was determined by SEM (scanning electron microscope) analysis. All samples fired at 900° C showed a particle size range of submicron to 2 microns, and mostly submicron. The 1200° C fired samples showed a particle size in the range of 1 to 5 microns, with only minor amounts of submicron particles, thus indicating that some sintering or "necking" of particles had occurred.

Spectral reflectance of the samples was determined by forming a water suspension of the powder particles, spraying the suspension on aluminum blocks to build up a layer 4 to 10 mils thick, inserting the blocks in a reflectometer and measuring reflectance at wavelengths from 0.32 to 0.5 microns (325 to 500 nm). Samples fired at 900° C and prepared from mixtures having zinc-to-titanium ratios of 2.00:1 and 2.05:1 showed a sharp break, or "knee" in their reflectance spectra curves below the 380 nm. characteristic absorption edge for zinc oxide, reflectance decreasing to 35 to 50 per cent at slightly lower wavelengths. For 900° C samples having zinc-to-titanium ratios of 1.90:1 and 1.95:1, the break in the spectral curve was minor or non-existent, indicating absence of any free zinc oxide.

The samples were then subjected to irradiation testing under simulated space conditions (ultraviolet radiation in vacuum) to determine their long term stability. After 1000 ESH (equivalent sun hours) a sample fired at 900° C and having a zinc-to-titanium molar ratio of 1.95:1 showed an increase in absorptance of only 0.02 over its original valve of 0.11, thus indicating excellent stability.

The above example is merely illustrative, and one skilled in the art can make various changes and modifications in the procedures given therein without departing from the spirit and scope of the invention.

What is claimed is:

1. The method of preparing zinc orthotitanate in the form of very fine particles which comprises forming a mixture of precipitated oxalates of zinc and titanium having a zinc-to-titanium molar ratio of 1.92:1 to 1.98:1, heating said mixture first at a temperature of 400° to 600° C and then at a temperature of 900° to 1200° C.

2. The method of claim 1 wherein the final heating is at a temperature of about 1000° to 1250° C.

3. The method of claim 1 wherein said heating at a temperature of 900° to 1200° C includes the step of inserting a container of said mixture into an oven preheated to 900° to 1200° C.

4. The method of claim 1 wherein said mixture is prepared by coprecipitation of said oxalates from a chloride solution.

5. The method of claim 1 wherein said mixture is prepared by combining separately precipitated zinc oxalate and titanium oxalate.

* * * * *